Patented Oct. 17, 1950

2,526,558

UNITED STATES PATENT OFFICE 2,526,558

PREPARATION OF NOVEL N-CARBOXY-ALKYL MORPHOLINES

Thomas L. Gresham and Forrest W. Shaver, Akron, Ohio, assignors to The B. F. Goodrich Company, New York, N. Y., a corporation of New York No Drawing. Application November 19, 1948, Serial No. 61,127

4 Claims. (Cl. 260—247.2)

This invention relates to the preparation of novel nitrogen and oxygen containing organic compounds, particularly N-carboxyalkyl substituted morpholines, and pertains particularly to the preparation of such compounds by the reaction of morpholine with beta-lactones.

It is disclosed in U. S. Patent 2,356,459 that beta-lactones, that is, lactones or inner esters of beta-hydroxy carboxylic acids, may be obtained in good yields by the reaction of a ketene with an aldehyde or ketone. In this manner beta-propiolactone (also called hydracrylic acid lactone) which has the structure

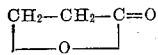

is economically obtained from ketene and formaldehyde.

We have now discovered that beta-propiolactone, and also the liquid homologs thereof (that is, liquid saturated aliphatic beta-lactones) will react with morpholine (also known as diethyleneimide oxide and tetrahydro-1,4-oxazine) either in aqueous solution, in a substantially organic medium, or even in the absence of any solvent or diluent in such a way that the beta carbon atom of the beta-lactone is connected to the nitrogen atom of morpholine to form in very high yields N-carboxyalkyl substituted morpholines which possess the general structure

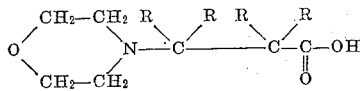

wherein each R is selected from the class consisting of hydrogen or lower alkyl.

The reaction of morpholine with beta-lactones in accordance with this invention proceeds substantially as shown by the following equation:

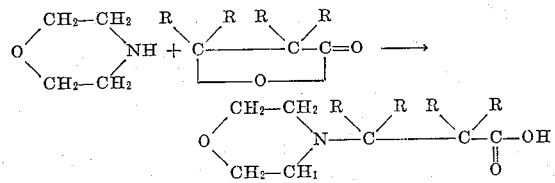

wherein each R has the meaning set forth hereinabove. This reaction provides a convenient and economical method of obtaining numerous organic compounds useful as organic intermediates and for many other purposes, which compounds have not heretofore been prepared.

Beta-propiolactone is the preferred beta-lactone for use in the process, not only because it is more readily available and more economical in cost than other beta-lactones but also because its use results in the production of highest yield of purest N-carboxyalkyl morpholines and because the novel N-carboxyalkyl morpholines directly resulting from its reaction are quite useful chemicals per se, being especially useful as insecticides, fungicides, and plant growth regulants and are also useful intermediates in the preparation of many other valuable organic compounds. However, other saturated aliphatic beta-lactones which are liquid are also useful in the process, among which are such homologs of beta-propiolactone as beta-butyrolactone, beta-valerolactone, beta-isovalerolactone, alpha-methyl beta-propiolactone, alpha-ethyl beta-propiolactone, beta-isopropyl beta-propiolactone, beta-methyl beta-valerolactone, etc., all of which are liquid and possess the general structure

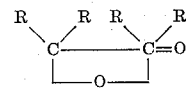

wherein each R is hydrogen or an alkyl group, preferably a lower alkyl group so that the lactone contains from three to six carbon atoms.

As has been stated above, the reaction of this invention may be carried out in aqueous solution, in the presence of an inert organic solvent, or simply by admixing the two reactants in the abscence of any solvent or diluent. Preferably an inert organic solvent is utilized since stirring the reaction mixture and heat removal is thereby facilitated, and the tendency for the beta-lactone to polymerize is repressed. The specific nature and amount of the solvent used, if any, are not at all critical since any polar or non-polar organic solvent may be used so long as it is capable of existing in the liquid state, and is substantially inert to the reactants under the conditions used. It is desirable that the solvent be volatile, and preferably that it have a boiling point below 150° C. since it can then be more readily recovered and reused in the process. Specific inert solvents which are effective include benzene, toluene, pentanes, hexanes, and other liquid saturated aliphatic or aromatic hydrocarbons; chlorinated liquid derivatives of such hydrocarbons as chlorobenzene and ethylene dichloride; liquid ethers such as diethyl ether, dipropyl ether, etc.; liquid esters such as methyl acetate, ethyl acetate, methyl propionate and the like; liquid organic nitriles such as acetonitrile, propionitrile, benzonitrile, etc.; and liquid ketones such as acetone, methyl ethyl ketone, etc. Liquid alcohols are also substantially inert to the reactants under the preferred conditions of the reaction (that is at temperatures of −30° to 100° C.) despite the fact that alcohols do react with beta-lactones under other conditions. Accordingly, such alcohols may be employed as solvents if desired, examples of suitable alcohol solvents being methanol, ethanol, ethylene cyanohydrin, ethylene chlorohydrin and especially tertiary alcohols such as tertiary butanol, and the like.

No special reaction conditions are necessary in order to carry out the reaction. The quantities of beta-lactone and morpholine employed are not critical but it is generally preferred to use equimolecular proportions of lactone and morpholine or an excess of morpholine, for example, from one to two moles of morpholine for each mole of lactone, since the presence of excess of beta-lactone is of no particular advantage and in fact may be disadvantageous due to the formation of lactone polymer.

The reaction is preferably carried out at atmospheric pressure and at a temperature in the range of −30° C. or lower to 100° C. or even higher, and more preferably at 0° to 50° C. The reaction is exothermic and liberates heat; hence, it is unnecessary to supply heat externally but it often is desirable to cool the reaction mixture in order to maintain the preferred temperature. However, other temperatures and pressures may be used provided the reactants are maintained in a liquid condition during the reaction.

In carrying out the reaction of this invention it is generally preferable to add the amine to a solution of the beta-lactone in water or in one or more of the solvents listed hereinabove at such a rate that about one-half to five hours are required for addition of the entire amount of morpholine, and with continued agitation of the solution during the addition. However, the beta-lactone may be added to a stirred solution of the morpholine in an organic solvent or in water, if desired, without affecting the fundamental course of the reaction to give an N-carboxyalkyl morpholine, or any other procedure for bringing the reactants together at −30° to 100° C. is also effective. Slow addition of one reactant to the other, and agitation of the solution during the reaction are both helpful in maintaining the desired temperature (since the reaction is exothermic and may generate sufficient heat to cause the temperature to rise considerably above 100° C. if heat transfer is not efficient) but are not critical expedients in themselves. The time during which the reactants must be left in contact is likewise not critical and will depend upon the total quantity of reactants being used; in general the reaction is quite rapid and is complete, as evidenced by cessation of heat evolution, within a short time after all of the two reactants have been brought into efficient contact with each other.

As the reaction proceeds, the product separates from the reaction mixture in the form of crystals which may be easily separated from unreacted morpholine and beta-lactone as well as the solvent, if any, simply by filtering. A product of higher purity is obtained by recrystallizing the solid product from an organic solvent such as ethanol or methanol. However, other conventional methods of separation may also be used without seriously affecting the yield of the product obtained.

The practice of the invention is further illustrated by the following examples in which all parts are by weight.

EXAMPLE I 72 parts (1 mole) of beta-propiolactone are slowly added to 87 parts (1 mole) of morpholine while maintaining the temperature of the reaction mixture at about 50° C., the mixture being constantly stirred. As the addition continues, a crystalline solid precipitates and when addition of the beta-lactone is complete the crystalline solid is separated from the reaction mixture by filtering. After a single crystallization from methyl alcohol there are obtained 126 parts (79%) of N-carboxyethyl morpholine (M. P. 74–76° C.; identified by potentiometric titration).

EXAMPLE II 72 parts (1 mole) of beta-propiolactone are dissolved in 234 parts of acetonitrile while maintaining the temperature of this solution at 15° to 20° C. by external cooling means. 87 parts (1 mole) of morpholine are added over a period of 30 minutes, the reaction mixture being constantly agitated. The solid which precipitates from the reaction mixture is removed by filtering and crystallized from diethyl ether. 146 parts (92%) of N-carboxyethyl morpholine (M. P. 74°–76° C. identified by potentiometric titration and analysis of the hydrochloride) are obtained.

Analysis:

| Calculated for $C_7H_{14}O_3NCl$ | Found |
| --- | --- |
| C, 43.20 | 43.0 |
| H, 7.23 | 7.21 |
| N, 7.10 | 7.15 |
| Cl, 17.93 | 18.11 |

While the above examples illustrate the process of this invention they by no means include all the various embodiments. Thus, the examples may be repeated with any of the other saturated aliphatic beta-lactones being substituted for beta-propiolactone as disclosed with some reduction in yield but with the obtainment of predominant yields of N-carboxyalkyl morpholines analogous with those obtained from beta-propiolactone and morpholine.

Accordingly, it will be understood that the invention is not intended to be limited to specific embodiments, but only as required by the spirit and scope of the appended claims.

We claim:

1. The method which comprises bringing together reactants consisting of a liquid saturated aliphatic beta-lactone and morpholine, whereupon chemical reaction occurs between the said beta-lactone and the morpholine, and then recovering from the reacted liquid mass an N-carboxyalkyl morpholine.

2. The method which comprises bringing together reactants consisting of beta-propiolactone and morpholine, while maintaining the temperature of the liquid at −30° C. to 100° C., whereupon chemical reaction occurs between the beta-propiolactone and the morpholine, and recovering N-carboxyethyl morpholine from the reacted liquid mass.

3. The method which comprises bringing together in an inert organic solvent reactants consisting of beta-propiolactone and morpholine, while maintaining the temperature of the liquid at −30° C. to 100° C., whereupon chemical reaction occurs between the beta-propiolactone and the morpholine, and recovering N-carboxyethyl morpholine from the reacted liquid mass.

4. The method which comprises bringing together in acetonitrile solution, reactants consisting of beta-propiolactone and morpholine, while maintaining the temperature of the liquid at $-30°$ C. to $100°$ C., whereupon chemical reaction occurs between the beta-propiolactone and the morpholine, and recovering N-carboxyethyl morpholine from the reacted liquid mass.

THOMAS L. GRESHAM.
FORREST W. SHAVER.

REFERENCES CITED

The following references are of record in the file of this patent:

UNITED STATES PATENTS

| Number | Name | Date |
|---|---|---|
| 591,483 | Merling | Oct. 12, 1897 |
| 2,152,132 | Boese | Mar. 28, 1939 |
| 2,167,351 | Eisleb | July 25, 1939 |
| 2,375,005 | Kung | May 1, 1945 |
| 2,425,693 | Cook et al. | Aug. 12, 1947 |
| 2,449,990 | Gresham et al. | Sept. 28, 1948 |
| 2,449,994 | Gresham et al. | Sept. 28, 1948 |

OTHER REFERENCES

Basle, Ber. der Deu. Chem., vol. 17 (1884), pp. 1502–1503.

Johansson, Chem. Zentralblatt, vol. 1916 II, pp. 557–558.

Weisel et al., Chem. Abstracts, vol. 39, 1946, p. 4053.

Certificate of Correction

Patent No. 2,526,558                                                          October 17, 1950

THOMAS L. GRESHAM ET AL.

It is hereby certified that error appears in the printed specification of the above numbered patent requiring correction as follows:

Column 1, lines 43 to 47, inclusive, for that portion of the equation reading

column 2, lines 20 to 23, inclusive, for the equation

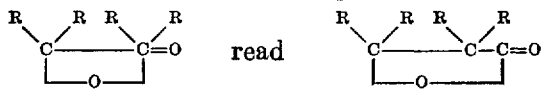

and that the said Letters Patent should be read as corrected above, so that the same may conform to the record of the case in the Patent Office.

Signed and sealed this 30th day of January, A. D. 1951.

[SEAL]

THOMAS F. MURPHY,
*Assistant Commissioner of Patents.*